United States Patent [19]
Schut

[11] 3,737,990
[45] June 12, 1973

[54] METHOD OF MAKING A COIL FOR AN ELECTROMAGNETIC HIGH ENERGY IMPACT APPARATUS

[75] Inventor: Hendrik P. Schut, Mercer Island, Wash.

[73] Assignee: The Boeing Company, Seattle, Wash.

[22] Filed: Apr. 12, 1971

[21] Appl. No.: 133,090

[52] U.S. Cl. ............... 29/605, 29/DIG. 33, 156/53, 336/205, 336/209, 336/223
[51] Int. Cl. ............................................. H01f 7/06
[58] Field of Search ..................... 29/605, DIG. 33; 336/205, 209, 223, 232; 156/53, 54

[56] References Cited
UNITED STATES PATENTS

| | | | |
|---|---|---|---|
| 2,656,290 | 10/1953 | Berberich et al. | 336/205 X |
| 3,099,074 | 7/1963 | Polzella et al. | 29/605 X |
| 3,548,355 | 12/1970 | Martincic et al. | 336/223 X |
| 2,362,909 | 11/1944 | Lind et al. | 29/DIG. 33 |
| 2,980,874 | 4/1961 | Tarbox | 336/223 |
| 2,177,260 | 10/1939 | Laube | 336/205 X |
| 3,462,544 | 8/1969 | King | 336/205 X |
| 3,367,816 | 2/1968 | Mills | 29/605 UX |
| 2,935,631 | 5/1960 | Jones | 156/53 X |
| 1,874,723 | 8/1932 | Dawson, Jr. | 336/205 X |

Primary Examiner—Charles W. Lanham
Assistant Examiner—Carl E. Hall
Attorney—Glenn Orlob, Kenneth W. Thomas and Conrad O. Gardner

[57] ABSTRACT

An apparatus utilizing electromagnetic energy for producing high impact forces by means of a ram propelled against a work piece. A specific utilization of the apparatus is in the installation of fasteners such as rivets in structural assemblies. The apparatus described herein is the work center of an electromagnetic impact tool and comprises the following components: electromagnetic high energy pulse coil, ram means, aerostatic bearing means and connector means.

7 Claims, 18 Drawing Figures

INVENTOR.
HENDRIK P. SCHUT

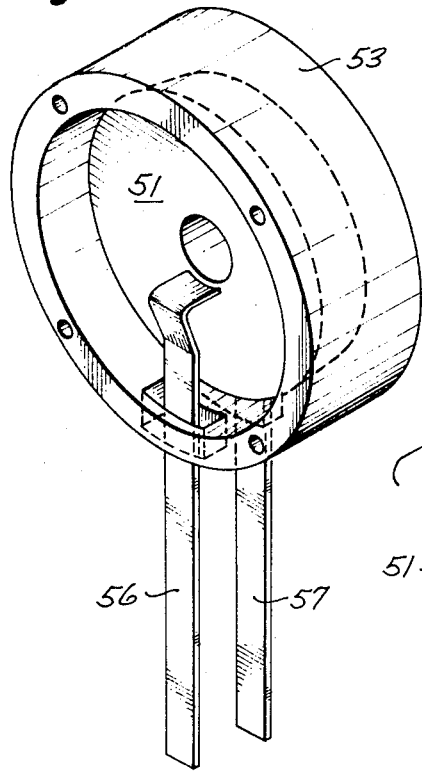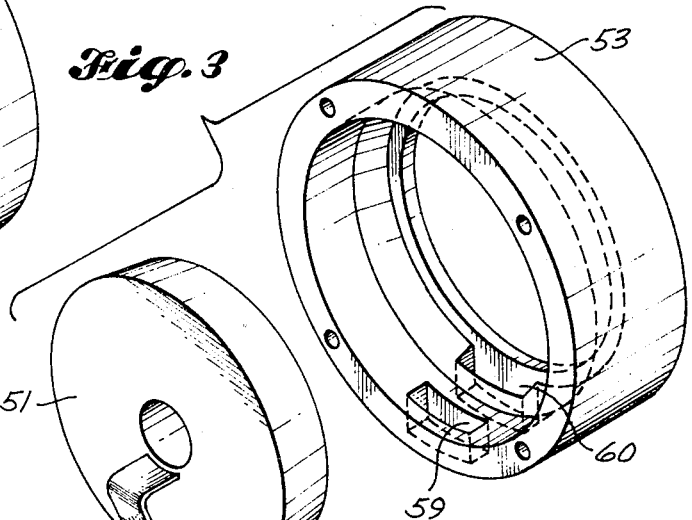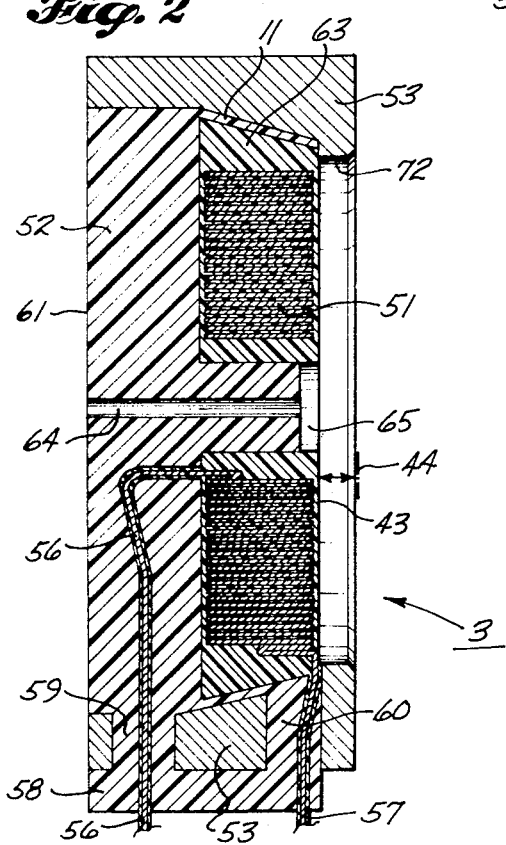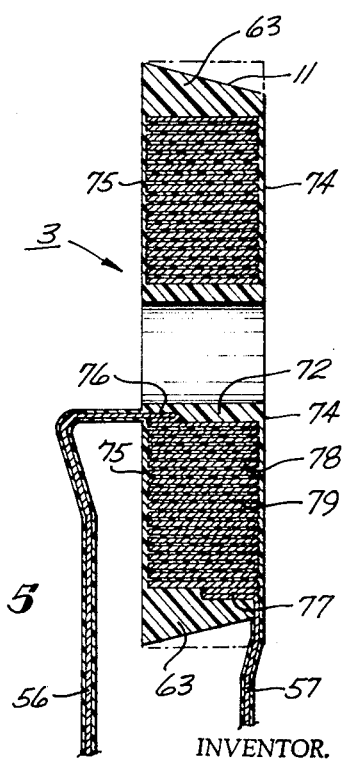

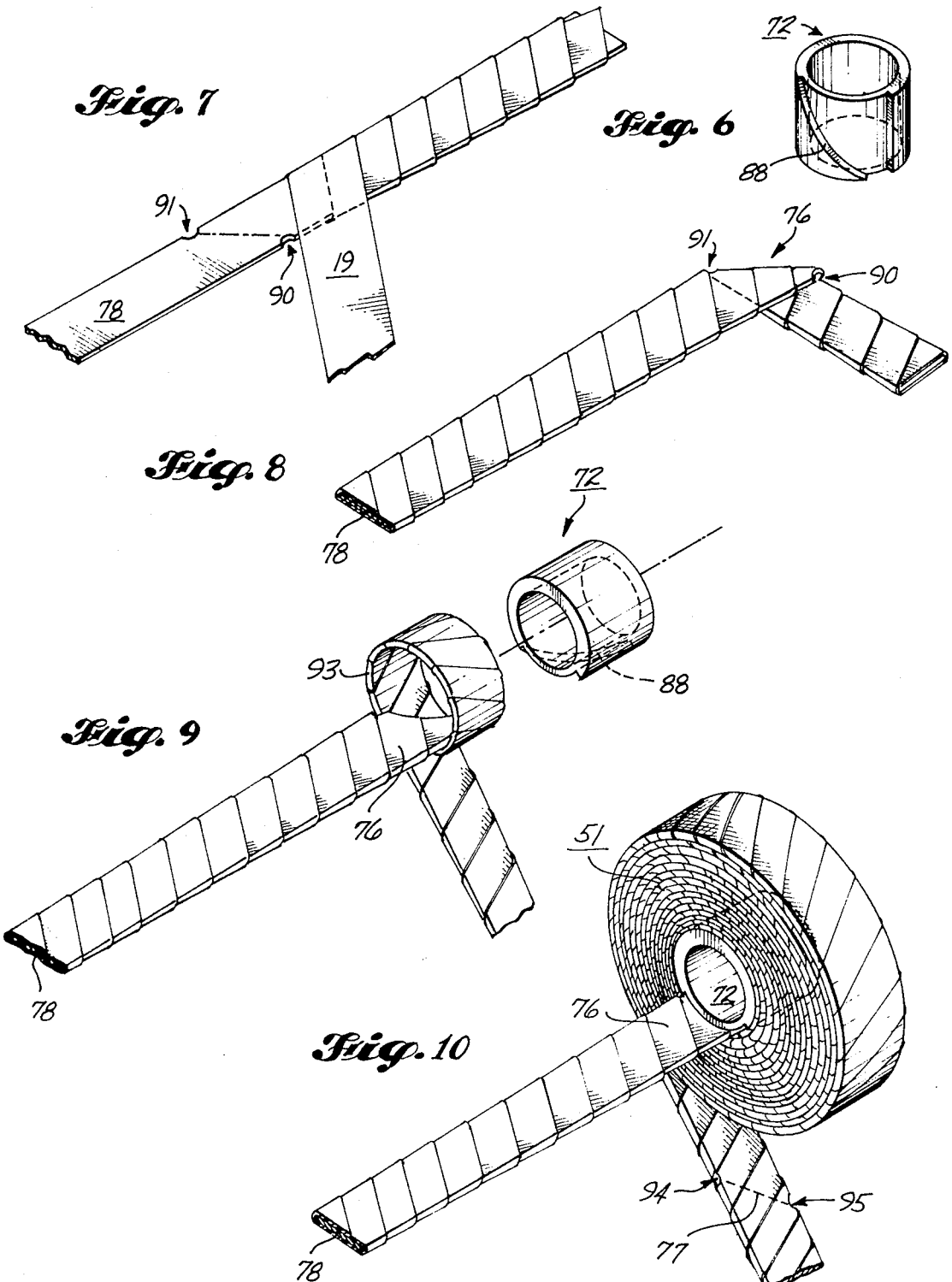

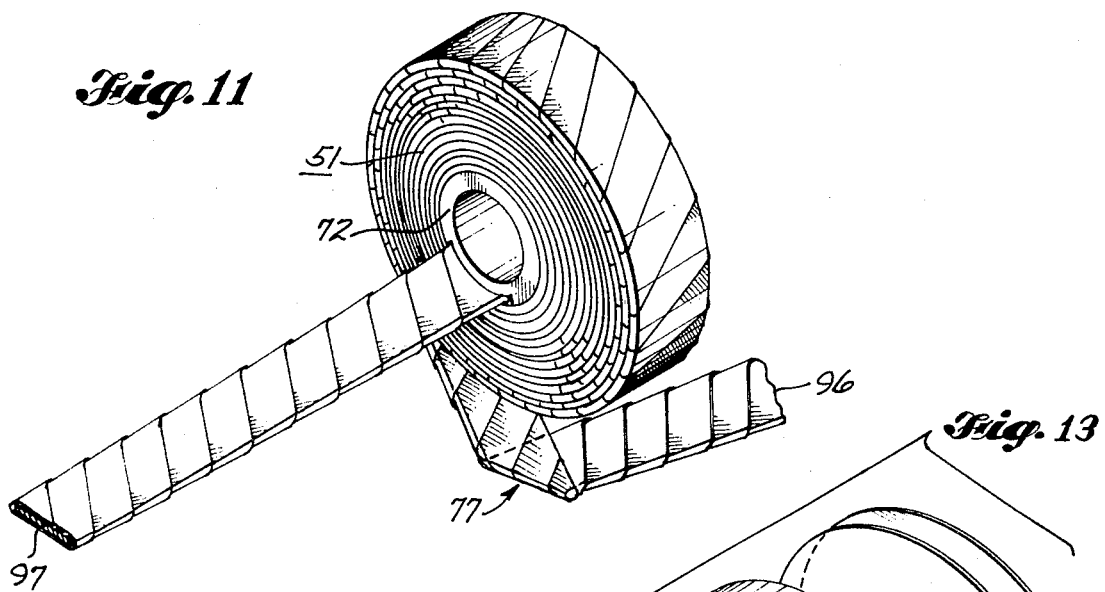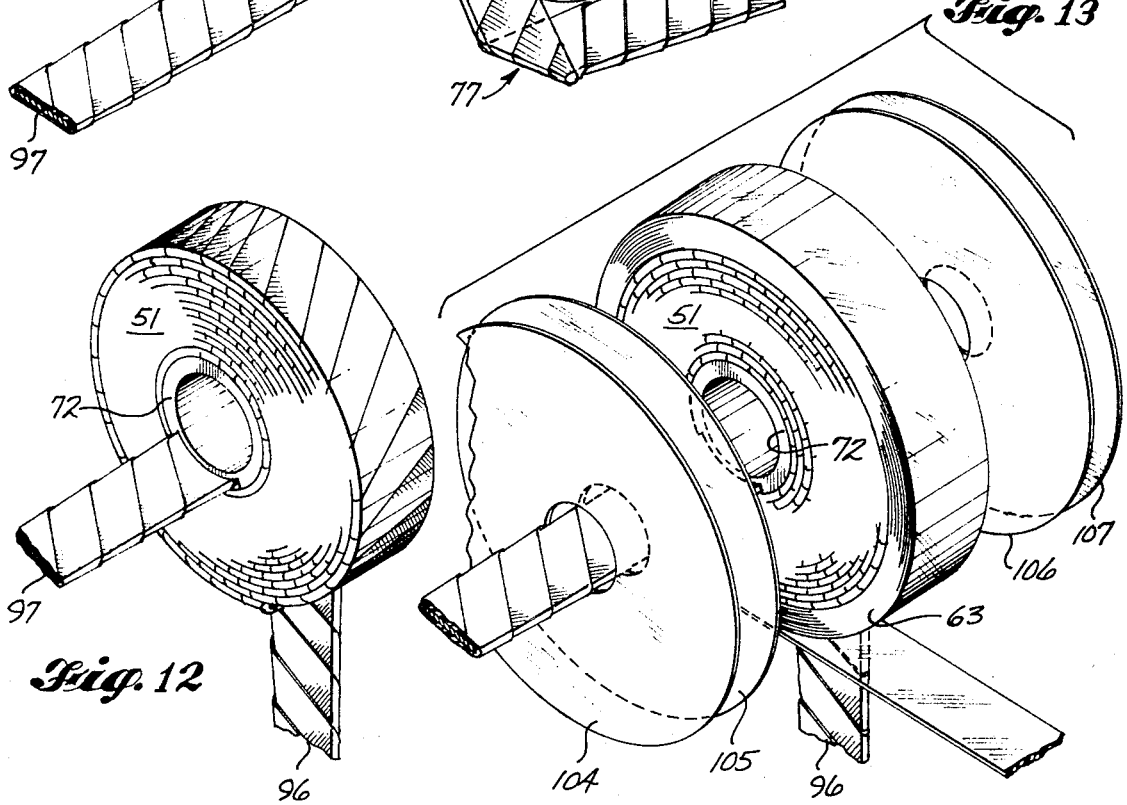

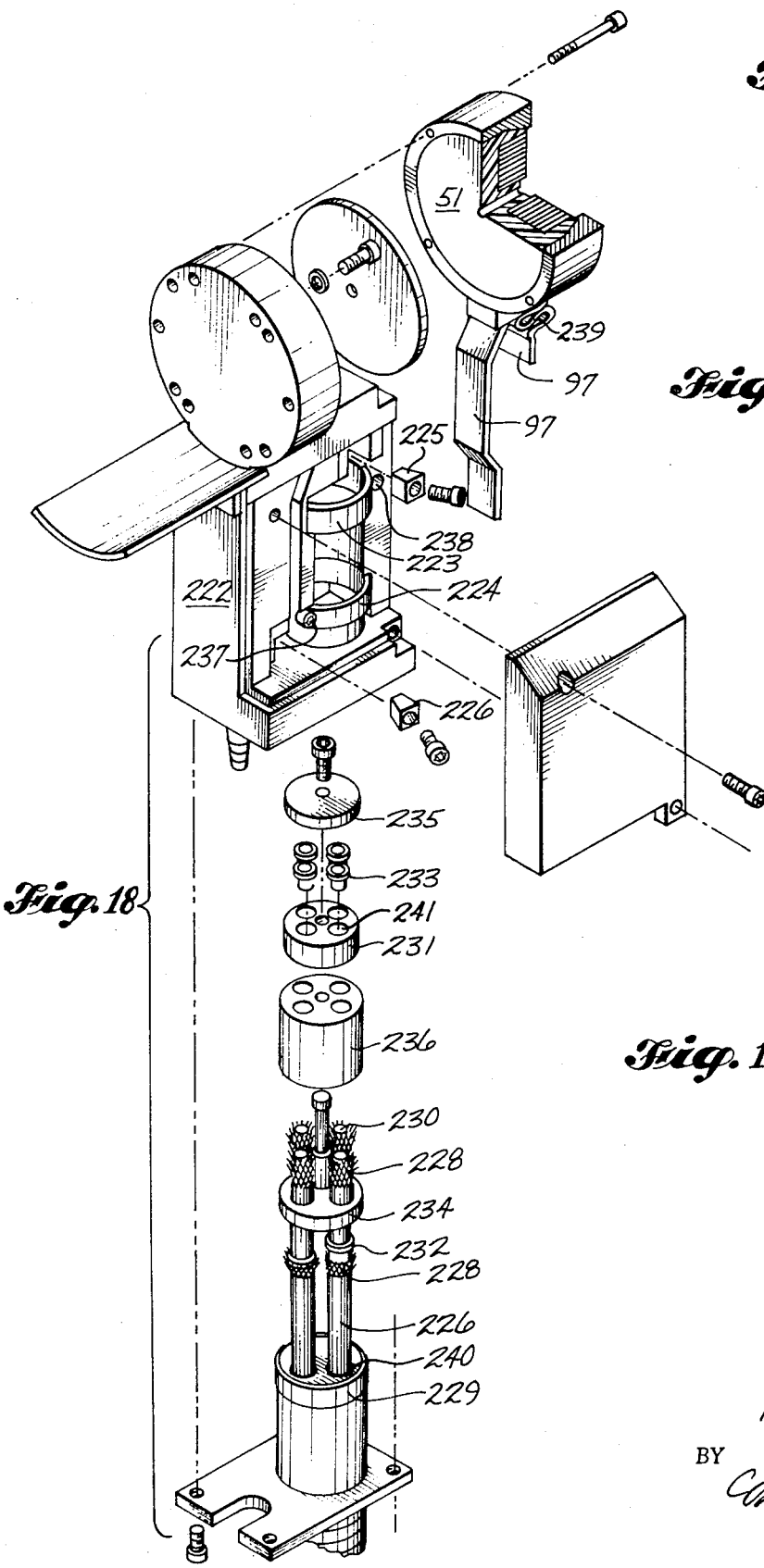

METHOD OF MAKING A COIL FOR AN ELECTROMAGNETIC HIGH ENERGY IMPACT APPARATUS

CROSS REFERENCE TO RELATED APPLICATIONS

While this application relates to the particular novel arrangement of the work center of the electromagnetic impact tool, the principles of operation and general construction of the over-all portable tool structure used herein are disclosed in two co-pending applications having a common assignee, respectively Ser. No. 749,386, filed Aug. 1, 1968, titled, "Electromagnetic High Energy Forming" and Ser. No. 776,014, filed on Nov. 15, 1968, titled "High Impact Portable Riveting Apparatus," which are invorporated by reference and may be referred to for further details of the tool and associated power supply and control circuits which may be used therewith.

BACKGROUND OF THE INVENTION

This invention relates to apparatus for mechanically forming material and more particularly to forming material by apparatus utilizing energy acquired from a high intensity transient magnetic field.

DESCRIPTION OF THE PRIOR ART

Many techniques of electromagnetic forming have been developed over the course of recent years. Common to all of these processes is the utilization of an electrical pulse coil to produce a high intensity transient electromagnetic field. The electrical and mechanical design of the coil is influenced by a great number of factors which are primarily determined by the specific applications. The parameters affecting the electrical characteristics of the coil are its physical size, wire size and configuration, conductivity, number of turns and over-all configuration. Once the desired electrical coil parameters have been calculated for a certain application, the mechanical coil design is now crucial to the final realization of the desired pulse coil. The mechanical parameters govern, for instance, characteristics such as structural integrity of the coil, its temperature range, insulation properties, reproducibility, and combinations of these various features. In the course of pursuing the development of an electromagnetic coil for riveting applications it became apparent that, because of its significantly different performance requirements compared to other electromagnetic coil applications, the available state-of-the-art coil fabrication techniques were inadequate to provide the desired coil for production riveting Exemplary of unsuitable coil fabrication techniques are those used in coils which have been developed for physics applications to be energized only once in a lifetime and allowed to self-destruct during the process of producing an extremely high intensity field and then be replaced and those used in coils which have been designed for multiple operations up to hundreds or thousands of pulses, and having time intervals between energizations that are large enough to eliminate heating problems or in which the energy density is reduced to a practical, acceptable minimum level.

The basic requirements for an optimum electromagnetic riveting coil for the present applications may be summarized in the need for a coil that produces the maximum riveting force with the highest intensity field within the smallest possible envelope while still capable of withstanding the inherent mechanical stress loads at cycling rates of multiple pulses per minute for many thousands of times. Deterioration of coil characteristics during its lifetime, for instance, caused by a gradual change in coil geometry, is detrimental and may result in self-destruction or result in inoperability. Furthermore, because of the desirability of having interchangeable coils in production equipment, a fabrication process is required that allows for reproducibility of the typical coil characteristics. Of further importance, the fabrication process should result in reliability and abovementioned life expectancy and at an economically realistic price.

During the initial electromagnetic pulse coil developent stage it was attempted to build boils utilizing conventional fabrication techniques which results led to a relatively low efficiency type structure which resulted in even more severe insulation and heat dissipation problems because of the higher current and voltage requirements inherent with the lower efficiency. The conventional coil consisted of a wet-wound epoxy and fiberglass insulated coil, either potted to its final dimensions or potted to size in a dielectric retaining ring. Coil terminal connections were in the usual manner soldered onto the wound coil body and exiting from the back side of the coil. Shortcomings of this standard prior art design are numerous and are not critical in many applications and tolerated in others and include, e.g., wet winding which does not allow the accurate maintenance of coil geometry, conductor spacings and face insulations. Furthermore, relatively thick layers of insulation are required in accordance with this prior art approach to obtain sufficient dielectric strengths which, in turn, results in lower efficiency and thus more severe heat dissipation problems. Another significant problem encountered with epoxy made coils is the relatively low temperature classification of such systems which limits the rate of firing of the coil or results in early mechanical breakdown. In order to obtain maximum efficiency of the coil, the conductivity of the conductor material is selected to have an optimum value for a given mechanical strength requirement. In the case of selecting pure copper as a conductor, an additional significant problem was encountered in obtaining mechanical bond strengths between the copper and epoxy system which resulted in a lack of structural integrity.

No satisfactory solution for readily disconnecting the portable riveting apparatus from its electrical power source was available for the present application and the development of an all-mechanical disconnectable connector system rated for high voltage and current requirements comprising a multiple coaxial cable connector adapted to the coil terminal connectors as disclosed in this application resulted.

From the above it can be seen that attempts to utilize prior art techniques in the present requirements led to more problems than solutions.

SUMMARY OF THE INVENTION AND OBJECTS:

From the foregoing discussion of the prior art, it becomes apparent that there is a need for a simply constructed, reliable electromagnetic work center for usage in a high impact portable riveting apparatus. It is therefore a principal object of this invention to provide an improved tool work center for converting electrical energy into mechanical energy by means of elecgromagnetic force utilization. The invention utilizes a novel coil construction technique that permits the fabrication of a coil producing an optimum impact force at the highest intensity fields within the smallest possible envelope while still withstanding the inherent mechanical stress loads at cyling rates up to many pulses per minute for thousands of times. It is a further object of the invention to provide a fabrication process allowing for reproducibility of the characteristic electromagnetic properties and including reliability and life expectancy within an economically realistic price range.

It is a related object of the invention to provide an improved monolithic coil construction for converting electrical energy into electromagnetic energy.

It is a further object of this invention to protect the electromagnetic coil face from mechanical abuse by ram rebounce of the work piece by the particular utilization of an aerostatic bearing.

It is a related objective of the invention to provide for effective cooling of both the coil and driver face by means of the unique aerostatic bearing medium.

A still further object of the invention is to provide for a connector construction that allows rapid mechanical disconnect of high voltage and current carrying power connections between coil and feeder cable.

It is an additional object of this invention to provide a ram structure featuring an insulator plug for providing operator safety by electrically isolating the electromagnetic working faces of coil and ram from the mechanical working end of the ram.

In accordance with the present invention, the construction of a novel high energy impact tool suitable for extended production usage periods has become a reality. The specific features and advantages of the instant invention will become more clearly apparent from the following detailed description thereof which is to be read with reference to the accompanying drawings.

BRIEF DESCRIPTION OF THE DRAWINGS

FIG. 2 shows a cross-sectional view of one embodiment of electromagnetic pulse coil assembly.

FIG. 3 shows the cartridge coil and coil retaining ring comprising the electromagnetic coil assembly of FIG. 2 before detail engagement.

FIG. 4 shows the cartridge coil of FIG. 3 assembled in the retaining ring.

FIG. 5 shows the cartridge coil of FIG. 3 in cross-sectional view.

FIG. 6 through 13 show the various steps in the manufacturing process of the cartridge coil of FIG. 3.

FIGS. 14 through 17 show several further cartridge coil geometries that may be realized by the cartridge coil manufacturing process.

FIG. 18 shows an exploded view of the complete coil to cable connector assembly.

Figure 1:
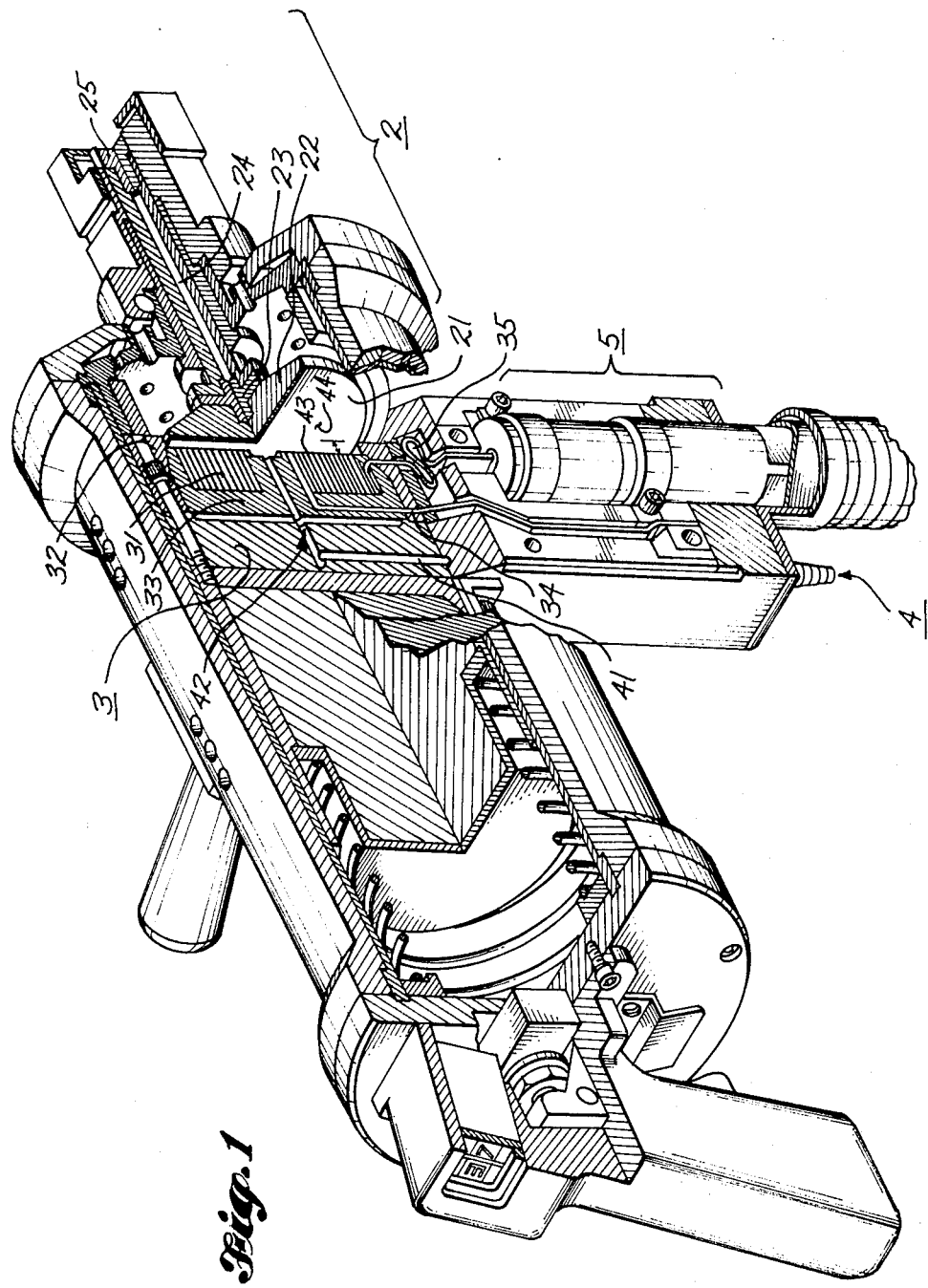
FIG. 1 shows a cut-away view of the generalized embodiment of the invention with portions shown in cross section for clarity.

DESCRIPTION OF THE PREFERRED EMBODIMENTS:

To provide a general understanding of the working principles of the several embodiments of the invention, reference is directed initially to the generalized embodiments of the electromagnetic work center as illustrated in FIG. 1. The electromagnetic work center comprises the following assemblies: driving ram assembly 2, electromagnetic pulse coil assembly 3, aerostatic bearing having fluid input 4, and the male and female connector assembly 5. The ram assembly 2 comprises the following structures: the conductive driving plate 21, the driving disc 22, the insulator plug 23, the ram shaft 24, and the forming die 25. Elements 21 and 22 of the ram assembly are made of good electrical as well as thermally conductive material, for the purposes of obtaining an optimum electrical efficiency in electromagnetic energy transfer as well as obtaining desirable heat dissipation characteristics. Typical materials utilized, for instance, are respectively copper for the conductive plate 21 and aluminum for the driving disc 22. Ram shaft 24 and forming die 25 are made out of high strength materials such as hardened steel to transmit the impact load to the workpiece. The insulator plug 23 is made of dielectric insulating material which mechanically separates the driving disc 22 from the ram shaft 24, resulting in a complete electrical isolation of the electromagnetic working end 21 of the driving assembly from the mechanical working end of the ram shaft 24.

The electromagnetic pulse coil assembly 3 comprises the cartridge coil 31, the coil retaining ring 32, the potted cartridge coil embedding 33, and the cartridge coil terminal leads 34 and 35. Detailed description of the coil 31 construction and fabrication techniques will be given hereinafter in connection with FIGS. 2 through 17.

The aerostatic bearing means comprises respectively the bearing fluid supply channel 41 coupled to the fluid input 4, the restriction 42 in series therewith, and the bearing surfaces 43 and 44 coupled in the fluid flow path subsequent to restriction 42. The pressurized fluid is passed through the supply line 41, encounters a pressure drop by passing the restriction 42 and next flows to atmospheric pressure inbetween the bearing surfaces 43 and 44. Regulation of the supply pressure and restriction dimensions create a fluid cushion between the bearing surfaces 43 and 44 which physically separates the working face of the coil 31 and driving plate 21. As stated before, primary purposes of the aerostatic bearing are to protect the coil face 43 from damage caused by possible physical coil face 43 to driver bearing surface 44 formed by plate 21 contact while simultaneously allowing for a continuous transfer of heat dissipated at the coil and driver surfaces 43 and 44 respectively through the constant flow of bearing fluid. In order to have a functional bearing without an appreciable loss of electrical coupling through excessive separation between the coil 31 and driver 22, the smallest possible gap should be maintained between the bearing surfaces 43 and 44. In order to maintain the smallest functional bearing gap, flatness of both the coil 31 and driver 22 faces are a prerequisite. Operation of the bearing is now as follows: when the driving plate 21 moves towards the coil face 43 and the gap closes between the coil 31 and plate 21, lesser fluid will be allowed to escape through the gap between surfaces 43 and 44. Therefore, the flow through the restriction 42 will be reduced which on its turn creates a lesser pressure drop acorss the restriction 42. This results in a pressure increase in the bearing gap formed by the volume between surfaces 43 and 44 till a balance in forces is obtained.

Description of the complete connector assembly 5 will be given hereinafter in detail in connection with the discussion of FIG. 18.

A discussion of FIGS. 2 through 17 showing the construction and fabrication process of the electromagnetic pulse coil assembly 3 follows. FIG. 2 shows a cross-sectional view of the completed coil assembly 3 containing the cartridge coil 51, the cartridge coil embedding 52, and the cartridge cil retaining ring 53. Detailed construction and fabrication technique of the cartridge coil 51 will be discussed in connection with FIG. 5 and following figures. The cartridge coil embedding material 52 is subjected to high mechanical impact forces and complies with the following requirements: an extremely low coefficient of thermal expansion permitting encapsulation of metals like copper and aliminum, low curing shrinkage, a high thermal conductivity, a high dielectric strength, and an optimum combination of flexural strength, compression strength and impact streangths at temperature applications well above 300°F. Consideration of a practical nature are the acceptability of the mixing and handling properties in conjunction with possible hazardous conditions, such as poisonous vapors or skin irritations that might result from contact with the material. The preferred materials having an optimum combination of the above-described characteristics comprise highly ceramic filled high-temperature resistant epoxy potting compounds which are most often two-part thermosetting materials curing at elevated temperatures. To greatly improve the mechanical properties of the encapsulation material in this application, the potting material is reinforced with layers of fiberglass cloth or mixed-in threaded glass fibers. The cartridge coil embedding material 52 serves a number of purposes: first, it encapsulates and contains the cartridge coil 51 in the retaining ring 53. Secondly, it electrically insulates the coil 51 from its surroundings, it allows for heat dissipation through the encapsulating material 52, and, finally, provides support to the terminal leads 56 and 57 of the cartridge coil 3. The terminal leads 56 and 57 are subjected to electromagnetic forces in the areas of maximum field density tending to separate the leads 56 and 57 from the coil body 51. Furthermore, terminal leads 56 and 57 are carrying a high density current in opposite direction resulting in force interaction between the two terminal leads. Therefore, for additional support to the terminal leads, an external terminal lug 58 is potted onto the coil retaining ring 53. Potting material extends from the main body 52, through the retaining ring slots 59 and 60 into the terminal lug 58.

As shown in FIG. 2, the coil terminal leads 56 and 57 are exiting radially from the side of the coil. In this fashion a 100 percent coil assembly bearing surface 61 was obtained in contrast to the usual prior art terminal connections at the back of the coil. Also, this arrangement permitted the adaption of the unique connector system 5 (shown in FIG. 1) as discussed later on in this application in detail in FIG. 18.

The center hole 64 extending into coil face cavity 65 is part of the aerostatic bearing system discussed hereinbefore in connection with FIG. 1.

The cartridge coil 51 and embedding material 52 are contained in the coil retaining ring 53. The retaining ring 53 is made of a reinforced dielectric material and serves for the purpose of mounting the coil 51 by means of bolts or clamps which would not be readily feasible by using a full-size casting of the material 52 because of the hardness of the material and its incompatibility in tension loading. Metal retaining rings close to the coil body must be avoided because of reasons of efficiency reduction unless special precautions have been taken such as the incorporation of radial extending slots in the metal ring when used to cut down induced eddy currents. The interlocking of the cartridge coil 51 and the retaining ring 53 is obtained through the tapered diameter configuration 11 formed by the opposed bevelled surfaces of both the coil outer body 63 and the ring 53 with potting material in between these two surfaces. As shown in FIG. 2, the retaining ring 53 features a shoulder 72 which is incorporated for the following reasons: first, no encapsulating material 52 will be exposed at the coil face surface 43, and, secondly, improved aerostatic bearing characteristics can be obtained by the cylindrical shaped portion of the shoulder 72. The incorporation of the shoulder 72 was a solution to several serious problems encountered during actual coil testing under high density current conditions. One experience resulted in tiny pieces of the potting material 52 in the region of the aforementioned bevelled surface became exposed at the coil face, broke off and were trapped between the driving head comprising conductive plate 21 (see FIG. 1) of the ram means 2 and the coil bearing surface 43, resulting in damage of the insulation of the coil.

FIGS. 3 and 4 show respectively the cartridge coil 51 and retaining ring 53 before and after engagement. By inserting the terminal leads 56 and 57 into the slots 59 and 60 of the retaining ring 53, the cartridge coil 51 can be tilted and moved into the position as shown in FIG. 4. The assembled coil 51 and retaining ring 53 are now placed into a coil mold which positions the coil 51 concentric with the retaining ring 53 by means of a locator plug (not shown). Upon casting of the coil embedding 52 the locator plug forms the coil face cavity 65 which is part of the aerostatic bearing system.

Turning now to FIGS. 5 through 13, the construction and fabrication technique of the cartridge coil will now be discussed in more detail. FIG. 5 shows a cross-sectional view of the cartridge coil assembly 3, comprising the following structural features: coil center core 72, the coil outer body 63, the coil front face insulation 74, coil back face insulation 75, the coil terminal folds 56 and 57 respectively interfold 76, and outerfold 77, the coil windings 78 and coil winding insulation 79. As discussed previously, it was experienced during the development of the present electromagnetic pulse coil that wet winding beacme a major draw back in the attempt to obtain coil winding uniformity. In addition, the present applications a novel monolithic insulation system approach was found to prevent coil face destruction. Accordingly, new coil fabrication and insulation techniques were developed to provide the novel monolithic insulation system and polyimide plastic insulation film proved to be a material having the desired unique combination of physical and electrical properties over an extremely wide temperature range. This material is commercially available from DuPont Company of Wilmington, Delaware, under the trand name Kapton. Two types are available and include: Type H which is pure polyimide film and Type F a combination of Type H film coated on one or two sides with a fluoro carbon resin sold under the trademane TEFLON. The primary use of the Teflon coating herein is to provide a heat sealable surface on the non-melting polyimide base film adhering to the material itself or to other thermally stable substance such as metal for instance. The essential condition for bonding the Kapton F film is that the Teflon coating at the interface be melted at 550°– 600°F. and forced into intimate contact with the substances. Because of the material's characteristics, the application of Kapton material became extremely attractive for application in the present electromagnetic pulse coil design. However, problems in applying the polyimide insulating material to realize a complete bonding resulting in a true monolithic coil design had to be overcome. The following detailed description of the step-by-step manufacturing procedure described how monolithic coil design was met, producing an economically feasible production type coil in highly uniform quantities having superior efficiency, temperature classification and dielectric strength. In addition, the cartridge coil structure features a flat and smooth face surface achieved by the method which is of importance in the satisfactory application of the aerostatic bearing feature.

FIG. 6 shows the center core 72 of the cartridge coil assembly 3. In order to obtain a monolothic structure of the coil, the center core 72 is fabricated of Kapton F material. Experiments with Kapton F film revealed that it was possible to fuse heavy buildups of Teflon-coated Kapton into solid machinable material. This phenomena allowed for the fabrication of the prefused center core 72 of the coil assembly 3 as well as for the machining of the tapered outer body 63 of the coil assembly as will be discussed later on. The coil center core 72 is fabricated by tightly winding Teflon-coated Kapton film on a mandrel until a sufficient build-up has been obtained to acquire the desired outside diameter. Next the film, which is dry wound, is taped and clamped into position and fused at a temperature of approximately 600°F. The Teflon coating will melt at this temperature and after allowing enough time for all the Teflon to melt and having derived a uniform temperature, the mandrel is removed from the oven and allowed to cool in air. In the cooling process, the Teflon will become solid resulting in the derivation of a machinable material. Next, this material is machined to a geometry as shown in FIG. 6. The V-shaped slot 88 in the outside diameter of the core 72 accommodates the inner terminal fold 76 (See FIG. 5) of the cartridge coil 51 when starting to wind the coil. The coil is wound of a conductor 78 (see FIG. 7) having a rectangular cross-sectional area. The conductor geometry has to be controlled within narrow tolerances in order to yield the required flatness of the coil 51 as well as the uniform winding dimensions. Smoothly rounded edges are an additional requirement on the geometry of the conductor in order to prevent tearing of the notch sensitive Kapton film 19 while being wrapped around the conductor 78. The controlled thickness of the conductor 78 in combination with the dry tension winding operation permits production of coils with practically 100 percent uniformity on coil diameters. on the other hand, the controlled widths of the conductor strip provides the required flatness of the coil surface. FIG. 7 shows a conductor strip 78 partially wrapped with Kapton tape 19, applying a 50 percent overlap technique. Also shown in FIG. 7 are two semicircular notches 90 and 91, one on each side of the rectangular conductor strip 78. Notches 90 and 91 are placed diagonally with respect to each other in such a way that the connecting line between 90 and 91 makes a 45° angle with the centerline of the conductor 78. After completion of making the two semicircular notches with smoothly rounded edges, the conductor 78 is wrapped with tape covering the notches 90 and 91. Next, as shown in FIG. 8, the conductor is folded along the connecting line between the notches 90 and 91. The purpose of the notches is to eliminate material congestion at the corners of the terminal fold 76 which would create a high spot at the coil 51 surface. Next, the terminal fold 76 shown in FIG. 8 is preformed on a mandrel to conform to the required inside diameter of the coil as shown in FIG. 9. The preformed coil center coil 77 as shown in FIG. 6 is now inserted into the preformed inner-turn 93 shown in FIG. 9, whereby the terminal fold 76 is fitted into the slot 88 of the center core. The core 72 and inner terminal fold 76 are now inserted into a winding tool and the required number of turns are wound, as shown in FIG. 10. By controlling the tension during the winding operation and assuring a proper consistent overlap between the insulation wrapping of the conductor, a uniform tightly wound coil 51 can be obtained. After the last turn of the coil has been wound, notches 94 and 95 are again applied in order to enable the proper outer terminal fold 77 to be made along the dotted line as shown in FIG. 10. The notches 94 and 95 can be either pre-made, as is shown in FIG. 10, or the notches could be made after marking the strip for the position of the outer terminal and temporarily unwrapping the insulation of the outer film for the incorporation of the notches. FIG. 11 shows how the outer terminal fold 77 is next bent under 45° angle in such a way that the lead 96 points in opposite direction from the inner terminal lead 97, and next the lead 96 is folded down so as to extend radially from the coil body as shown in FIG. 12. The notches 94 and 95 allow the folding of the terminal in such a way that the radial extending terminal lead 96 is slightly recessed below the face of the coil, not disrupting the flatness of the work face. Upon completion of the outer terminal 96 folding the coil winding is now completed by wrapping Kapton tape film on the outer diameter of the coil 51 (See FIG. 13) until a sufficient build-up has been obtained to allow for machining the fused outer coil body 63 to its tapered configuration as shown in FIG. 5. FIG. 13 shows the coil with the outer wrapping build-up 63 of Kapton insulation film. Next step in the coil fabrication process is the preparation of the face insulation sheets 104 and 105. Each face insulation consists of one or more Kapton sheets 104, 105, 106 and 107 sandwiched together. However, at all times, the face insulation sheets 104 and 107 consist of a single Teflon-coated sheet of Kapton, whereas the coil sheeets 105 and 106 will consist of double-coated Kapton sheets, depending upon the desired amount of insulation on the face of the coil. Coil 51 and insulation sheets 104, 105, 106 and 107 are now assembled in a fusing tool which consists of a center mandrel and two pressure plates facing front and back of the coil 51. The Kapton face sheets 104 and 107 are placed on top of the coil whereby the single-coated Kapton sheets 104 and 107 are placed in the tool with the uncoated sides facing the pressure plates. The reason for this arrangement is that the coil will not fuse to the tool as would be the case if double-coated Teflon coating Kapto sheets like coil sheets 105 and 106 were placed on the outside. Before using the coil 51, the outside diameter of the Kapton build-up is clamped with a steel clamp while the pressure plates of the fusing tool are being bolted down to the desired width dimension of the coil using spacer blocks. The complete assembly is now heated up to 600°F. and a monolithic structure of the cartridge coil is obtained by fusing the center core 72, the turn-to-turn insulation wrapping 19 (see FIG. 7) of the coil 51, the face insulation 104, 105, 106 and 107, and the outer coil body 63 all in one operation. As an optional fusing method the heating furnace can be evacuated prior to the fusion of materials to eliminate air encapsulation between the coil turns and face sheets. Intimate contact between materials being fused together is provided through the greater thermal expansion of the conductor material 78 compared to the expansion of the steel clamp and fusing tool.

FIGS. 14, 15, 16, and 17 show different cartridge coil configurations that may be fabricated in a similar fashion as described in the previous discussion. The arrangement of the windings is different; however, in general the same fabrication techniques are applied. FIG. 14 shows a coil winding arrangement which is more desirable for withstanding higher mechanical impact loads, while FIGS. 15, 16 and 17 show further coil variations. The configurations of FIGS. 15, 16 and 17 all feature a mechanical turn-to-turn interlock, which effectively increases the structural integrity of such coils while, however, increasing fabrication complexity.

FIG. 18 shows an exploded view of the complete mechanical connector assembly which connects the electromagnetic pulse coil 51 to its power feeder cables, while FIG. 1 shows a cutaway view of the complete engaged system. Junction box 222 made of dielectric material, contains two female-type connector brackets 223 and 224. Coil terminal leads 96 and 97 connect to the coaxial poer cables 226 by means of the brackets 223 and 224. Brackets 223 and 224 are made of highly conductive material having good mechanical properties, such as brass, or beryllium copper. The connection from the coil 51 to the brackets 223 and 224 is now made in the following way: terminal leads 96 and 97 are clamped to the body of the brackets 223 and 224 by means of the tapered keys 225 and 226. The terminal leads 96 and 97 are actually squeezed between the tapered keys 225 and 226 and the sidewall of the brackets 223 and 224. Coaxial cables 226 have been selected for transmitting the high amount of energy from the power supply (such as shown in the aforementioned applications) to the coil because of their inherent low inductance values and low resistance characteristics. Either the inner 301 or the outer 302 braiding of the cable 226 is used for the incoming current while the outcoming current of the coil 51 returns through the opposite braiding. By putting more cables 226 in parallel (as shown in FIG. 18), total resistance and inductance values can be reduced to acceptable levels. In the system described in this disclosure, four cables 226 in parallel have been selected. The outer conductive braidings 228 are all connected to a male connector member 229 while all inner conductor braidings 230 are connected to the male connector member 231. Both male connector members 229 and 231 comprise rings which are made of good conductive material, such as brass or beryllium copper. Intimate contact between the conductor braidings and the respective connector rings is now accomplished respectively by means of the tapered sleeves 232 and 233. The conductive braiding is jammed between the tapered sleeve and the walls of the tapered holes 240 and 241 in the respective conductor ring, with all four sleeves being pushed down by a common pressure plate respectively 234 and 235. Spacer 236, made of dielectric material, is added to achieve a solid male plug assembly. The male plug assembly can now be inserted into the aforementioned female bracket receptacles 223 and 224, whereby the male connector ring 231 engaged with female receptacle 223 and male connector ring 229 with bracket 224. As stated above, a difference in diameter exists between the male rings 231 and 229 allowing the passage of ring 231 through ring 224. Brackets 223 and 224 are of a split ring design allowing clamping of the rings by means of either spring load only, or bolting down the circumferential clamps with the bolts 237 and 238. In order to relieve the shorter coil terminal lead 97 from physical straining due to deflection of the junction box 222 under coil impact load, the S-curve 239 has been incorporated for strain relief.

I claim:

1. The method of making an electrical coil comprising the steps of
   providing a conductor having a rectangular cross-sectional area;
   wrapping said conductor by winding in overlapping fashion and under tension a polyimide tape around said conductor, said polyimide tape having fluorocarbon resin coatings on both sides thereof;
   winding under tension a plurality of turns of said conductor so that opposing surfaces of said fluorocarbon resin coatings between windings of said conductor are in direct contact;
   providing semicircular notches on each side of said rectangular conductor under said tape before winding the last of said plurality of turns and then bending and folding down said conductor along a line extending between two of said notches so as to extend radially from said coil body after completion of said coil winding and before heating to provide the outer terminal of said coil;
   heating sais plurality of turns of said conductor to the fusing temperature of said fluorocarbon resin to cause melting and fusion together of said opposing surfaces of fluorocarbon resin coatings and adherence of said tape to said conductor and then
   cooling said plurality of turns of said conductor to form said coil.

2. The method according to claim 1 wherein said bending comprises bending said conductor at an angle of about 45 degrees.

3. The method according to claim 1 including the further step of wrapping a plurality of turns of polyimide tape on the outer circumference of said coil after folding down said conductor and before heating said plurality of turns.

4. The method according to claim 3 comprising prcistioning a first polimide sheet on each coil face with the outer uncoated surface of each of said first sheets facing away from each of said coil faces after wrapping said plurality of turns of said tape on the outer circumference of said coil and before heating said plurality of turns.

5. The method according to claim 4 comprising positioning at least a further polyimide sheet having fluorocarbon coatings on both sides thereof between each of said coil faces and said first sheets before heating said plurality of turns.

6. The method according to claim 4 comprising the further step of applying pressure to the outer uncoated surfaces of each of said first sheets while heating said plurality of turns.

7. The method according to claim 3 comprising machining off a portion of said plurality of turns of polyimide tape on the outer circumference of said coil after cooling said plurality of turns of said conductor to form said coil.

* * * * *